April 7, 1970  D. F. COLE  3,505,120
FUEL CELL COMPRISING FORAMINOUS SILVER ELECTRODE HAVING A
POROUS LAYER OF MAGNESIUM OXIDE
Filed Nov. 23, 1966
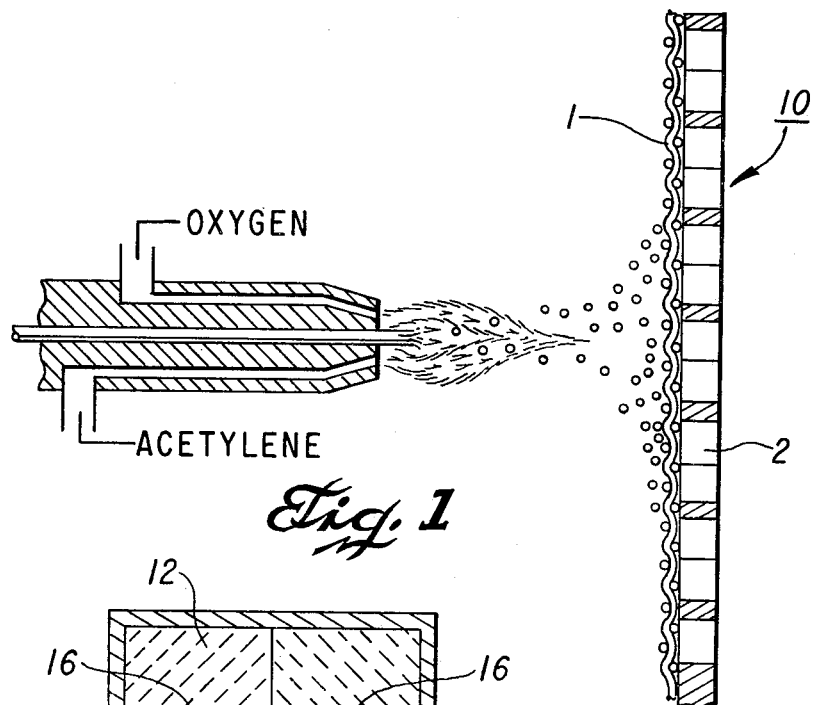
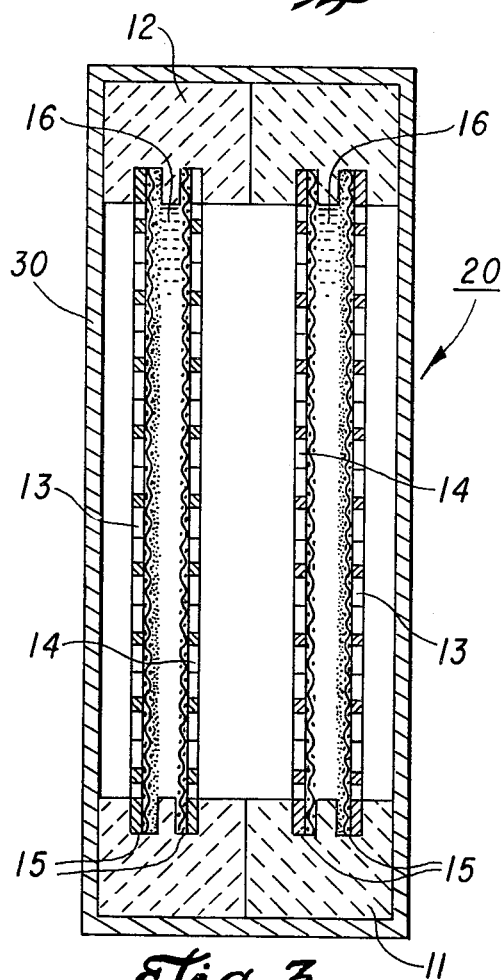
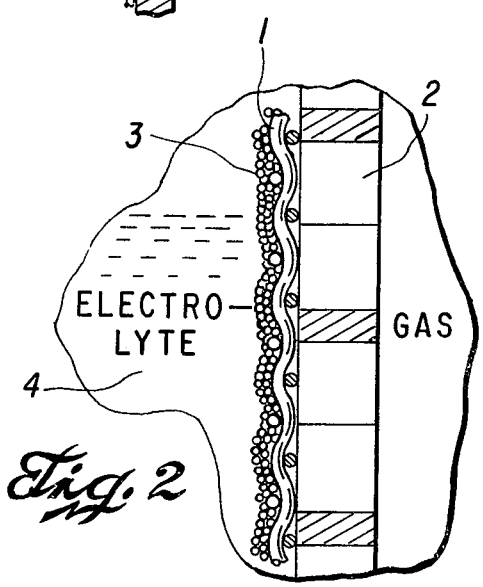
INVENTOR
David F. Cole
BY
Jack A. Kanz
ATTORNEY United States Patent Office 3,505,120
Patented Apr. 7, 1970

3,505,120
FUEL CELL COMPRISING FORAMINOUS SILVER ELECTRODE HAVING A POROUS LAYER OF MAGNESIUM OXIDE
David F. Cole, Dallas, Tex., assignor to Texas Instruments Incorporated, Dallas, Tex., a corporation of Delaware
Filed Nov. 23, 1966, Ser. No. 596,580
Int. Cl. H01m 13/00, 27/00
U.S. Cl. 136—86                3 Claims

ABSTRACT OF THE DISCLOSURE

A porous metal oxide coating on the electrode of a high temperature molten carbonate fuel cell, formed by flame spraying a metal such as aluminum or magnesium on the electrode and allowing the metal to oxidize during the heat up phase of fuel cell operation. Alternatively, aluminum oxide may itself be flame sprayed onto the electrode.

---

This invention relates to fuel cell electrodes, and more particularly to a new and improved fuel cell electrode and to a method of making such an electrode.

As is well known in the art, a molten carbonate fuel cell generally comprises a sodium lithium carbonate electrolyte in mutual contact with an anode and a cathode, whereupon a fuel, for example a hydrocarbon, reacts with the anode side of the electrolyte and an oxidant, for example air, reacts with the cathode side of the electrolyte. The reaction causes a flow of current when the anode and cathode are connected to an external circuit.

In fuel cells that operate at relatively high temperatures the cathode is commonly made of silver or silver compounds. Silver, however, has a limitation for use as a high temperature cathode material which somewhat adversely affects its efficiency. The oxide of silver is unstable at temperatures above 200° C., decomposes with the release of oxygen, and the resulting bare silver metal surface is not readily wetted by the magnesium-lithium sodium carbonate electrolyte matrix used in conventional high temperature fuel cells. Moreover, the efficiency of a fuel cell is related, in part, to the amount of three-phase contact area of the electrodes. By three-phase contact is meant, on the one hand, the contact between the oxidant, the electrolyte and the cathode and, on the other hand, the contact between the fuel, the electrolyte and the anode. Because the electrolyte does not wet the silver to any great extent, maximum efficiency of the fuel cell cannot be obtained. In addition, silver, when used as the cathode in high temperature fuel cells, corrodes during operation until the fuel cell is no longer operative. A further problem of high temperature fuel cells is maintaining the electrolyte seal. Even though low gas pressures are used, the fuel and/or oxidant gas will leak or blow out with a weak and non-uniform electrolyte seal.

Accordingly, it is an object of this invention to provide a more efficient high temperature fuel cell electrode by increasing the effective contact area between the electrode, the gas and the electrolyte.

It is another object of the invention to provide a high temperature fuel cell electrode with good non-corrosive properties.

It is a further object of the invention to provide a high temperature fuel cell electrode which extends fuel cell life.

A still further object of the invention is to provide a high temperature fuel cell electrode that tends to hold the electrolyte in the cells or pores of the electrode and thus prevent gas leakage.

Yet another object of the invention is to provide a method of making a high temperature fuel cell electrode with a porous, wettable and non-corrosive coating.

The novel features believed to be characteristic of the invention are set forth with particularity in the appended claims. The invention itself, however, as well as further objects and advantages thereof, may best be understood by reference to the following detailed description of an illustrative embodiment, when read in conjunction with the accompanying drawing, wherein:

FIGURE 1 is a pictorial view, partly in section, of a silver electrode, illustrating the electrode being flame-sprayed with aluminum, FIGURE 2 is a pictorial view, partly in section, of a portion of an aluminum sprayed electrode, illustrating the contact of the porous aluminum oxide coating with the molten electrolyte, while FIGURE 3 is a sectional view of a typical fuel cell, illustrating the use of an aluminum oxide coated cathode of the present invention.

In brief, the invention involves a porous metal oxide coating on the silver cathode of a high temperature molten carbonate fuel cell. The porous coating is formed by flame-spraying a metal such as aluminum or magnesium on the silver electrode and allowing the metal to oxidize during the heat-up phase of the fuel cell operation, or flame-spraying aluminum oxide itself. Although for simplicity the invention is described using aluminum or aluminum oxide as the flame-sprayed material, magnesium and magnesium oxide will work equally well.

In the operation of a high temperature fuel cell the aluminum oxide coating serves a number of purposes. As previously explained, the efficiency of an electrode in such a cell is directly related to the amount of three-phase contact area. Since it is difficult for the electrolyte to wet the silver electrode, the effective catalytic or current producing area of the electrode is thereby reduced. Although the porous aluminum oxide does not cause the electrolyte actually to wet the silver electrode, it nevertheless holds the electrolyte in close proximity to and in contact with the electrode.

During the operation of a high temperature fuel cell, the silver electrode slowly decomposes and eventually makes the fuel cell inoperative. The porous aluminum oxide coating on the silver tends to keep the corrosion products in its pores but near the electrode surface. These corrosion products form a protective region due to the concentration polarization of the corrosion reaction which tends to inhibit further corrosion of the silver electrode, thus extending electrode life.

Moreover, the "wettable" porous coating aids in sealing the cell by the electrolyte. This is due to the wetting action of the coating which prevents gas leakage and the mixing of the anode and cathode gas supplies. Such seal-ing action is quite effective since most electrolytes, molten salts for example, have very high surface tension. Gas leakage or blowouts result in lowering the cell voltage, produce fires, and cause melting or other destruction of cell components in addition to the inefficiency due to loss of fuel.

Referring now to the figures of the drawing, FIGURE 1 illustrates the flame-spraying of a foraminous silver electrode. The electrode, generally designated by the numeral 10, and used as the cathode of a fuel cell, is prepared, for example, by bonding a 120 mesh silver screen 1 to a silver plated 1/0 mesh expanded stainless steel screen 2. The silver screen 1 can be bonded to the expanded steel screen 2 by any conventional method. One bonding technique, for example, is to heat the silver screen 1 and the silver plated steel screen 2 under slight pressure at 850° C. for 3 hours in a neutral or reducing atmosphere. The electrode construction described is by way of example only. An electrode support is needed only when the perforated silver foil or screen is very thin but is not needed for heavier mesh-like electrodes. The aluminum oxide coating works equally well on all types of foraminous electrodes and is not limited to coating the electrode configuration illustrated in the drawing and herein described.

Following the bonding operation, the electrode 10 is placed in position for flame-spraying aluminum on the silver screen 1, said screen 1 being placed facing the flame-spray gun.

The porous aluminum oxide coating on the silver screen is formed by using conventional rod or powder flame-spray equipment. The flame-spray gun provides an arrangement whereby heat and gas velocity are supplied by the use of oxygen and acetylene gases to melt a material and project the material in a desired direction. The flame-spray gun feeds the material, either in powder or rod form, through the nozzle tip where it is melted by the combustion of acetylene and oxygen. The velocity of the heated gas breaks up the melted material into minute individual globules and forces them in the direction of the part to be coated, thereby forming a porous coating of aluminum over the surface of the silver screen.

The preferred embodiment of this invention entails the use of aluminum as the coating, which is flame-sprayed onto the silver electrode. The aluminum quickly oxidizes in the presence of air to form aluminum oxide when the operating temperature of the fuel cell is reached. Therefore aluminum oxide instead of aluminum can be used as the starting material. Such flame-spray conditions as distance of the surface to be coated from the nozzle tip and the rate of deposition are not critical to form a porous coating. As long as the coating thickness is kept below about four milinches with about two milinches being the nominal thickness, the coating will be sufficiently porous. It will be noted from FIGURE 1 that only the surface of the silver screen facing the electrolyte is sprayed. As the coating is deposited, however, the inside areas of the silver screen will also be coated to some extent. The opposite side of the electrode, that is, the side having the silver plated support 2 which will face the oxidant chamber, is not coated. The plated support is not coated in order to prevent the electrolyte from covering all of the electrode surface and thereby preventing common contact of the electrolyte, electrode and oxidant.

The porous aluminum oxide coating with its interconnecting pores allows the electrolyte to penetrate the coating and make contact with the silver electrode itself.

Although as indicated in FIGURE 2, the electrolyte 4, which in high temperature fuel cells can be lithium sodium carbonate, is molten at the operating temperature of the fuel cell, its high surface tension preventing it from flowing through the 120 mesh silver screen 1 of the electrode. Due to the fact that the aluminum oxide coating 3 is quite porous, as indicated in FIGURE 2, it serves a number of purposes, chief among which are an increase in the three-phase contact area, reduction of silver corrosion and a decrease in gas leakage. The flame-spraying method impinges minute globules of the sprayed material on the silver screen 1 until a layer of sufficient thickness is formed, approximately 4 milinches. Because aluminum oxide is easily wetted by the electrolyte 4, the electrolyte will penetrate the oxide through its open pore structure quite readily; and although not wetting the silver screen itself in the strict sense of the word, the electrolyte will be held in contact with the electrode by confinement in the pores of the aluminum oxide at the aluminum oxide and silver screen interface. By increasing the electrolyte and silver screen contact area, the three-phase contact area is thereby increased, thus increasing the efficiency of the fuel cell.

As a fuel cell is operated at its normal high temperature operating condition of approximately 650° C., the silver of a conventional silver cathode will slowly corrode, the corrosion products being diffused into the electrolyte and away from the electrode. With the use of the porous aluminum oxide cathode according to the invention, however, the corrosion products are not appreciably carried away but are held in close proximity to the corroding surfaces. The corrosion products, being adjacent to the reaction area, will inhibit further corrosion, thus extending the life of the electrode and thereby the life of the fuel cell.

A typical fuel cell is illustrated in FIGURE 3 and is designated by the numeral 20. It is to be understood that fuel cell 20 is merely an example of one form of fuel cell utilizing a porous aluminum oxide coated cathode, and that various fuel cell configurations may be substituted for the particular one shown in FIGURE 3.

The fuel cell 20 illustrated is one which uses a molten inorganic salt electrolyte. The cell comprises a housing 30 which contains a pair of channeled spacing members 11 and 12. Each spacing member has one or more channels 15 along one surface thereof and the channeled surfaces of a pair of spacing members are opposed and spaced apart. A pair of foraminous electrodes 13 and 14 within the channels are securely positioned and spaced substantially parallel to each other by the channels 15. The electrode 13 is fabricated according to the invention. A molten inorganic electrolyte matrix 16 such as MgO-LiNaCO$_3$ is contained between the electrodes. The fuel cell is typically operated at about 600–750° C.

In the embodiment shown, the inner electrodes 14 are the fuel anodes and the outer electrodes 13 are the oxidant cathodes. In operation, air and carbon dioxide are passed between the cathode 13 and housing 30. A hydrogen-containing gas is passed between the fuel electrodes 14.

As an example of actual fuel cell operation using the cathode electrode of the present invention, a fuel cell was prepared wtih a porous aluminum oxide coated silver cathode which operated with the following results: The electrolyte matrix used was MgO-LiNaCO$_3$ with a fuel supply of 80% H$_2$ and 20% CO$_2$ and an oxidant supply of 80% air and 20% CO$_2$. The fuel cell operated for 1150 hours at a temperature of 650° C. Between 102 hours and 770 hours, the fuel cell operated at an average power level of 59.5 watts/ft.$^2$ with a maximum power output of 87 watts/ft.$^2$ at 0.5 volt. This fuel cell had a much longer effective life than fuel cells using conventional silver cathodes.

While the invention has been described with reference to a specific method and embodiment, it is to be understood that this description is not to be construed in a limiting sense. Various modifications of the invention will become readily apparent to persons skilled in the art without departing from the spirit and scope of the invention as defined by the appended claims.

What is claimed is:

1. A fuel cell comprising an electrode, said electrode consisting of:

a foraminous strip of silver, and a porous layer of magnesium oxide (MgO) on one face of said strip of silver.

2. A fuel cell comprising:
an anode,
a foraminous silver cathode having one face thereof coated with a porous aluminum oxide, and
an electrolyte matrix disposed between and in contact with one face of said anode and the coated face of said silver cathode.

3. A fuel cell comprising:
an anode,
a foraminous silver cathode having a silver plated support therefor, said silver cathode being coated with a porous aluminum oxide on one face thereof, and
an electrolyte matrix disposed between and in contact with one face of said anode and the coated face of said silver cathode.

References Cited

UNITED STATES PATENTS

| | | | |
|---|---|---|---|
| 2,849,519 | 8/1958 | Freas et al. | 136—20 |
| 3,101,285 | 8/1963 | Tantram et al. | 136—120 |
| 3,251,718 | 5/1966 | Hilton | 136—86 |
| 3,215,563 | 11/1965 | Clemm | 136—86 |
| 3,219,730 | 11/1965 | Bliton et al. | 136—86 XR |
| 3,251,718 | 5/1966 | Hilton | 136—86 |
| 3,268,365 | 8/1966 | McQuade et al. | 136—86 |
| 3,382,103 | 5/1968 | Smith | 136—86 |

WINSTON A. DOUGLAS, Primary Examiner

A. SKAPARS, Assistant Examiner

U.S. Cl. X.R.

136—120